United States Patent
Duplouy

(10) Patent No.: US 8,973,460 B2
(45) Date of Patent: Mar. 10, 2015

(54) LINEAR ACTUATOR

(75) Inventor: Olivier Duplouy, Cergy Pontoise (FR)

(73) Assignee: Thales, Neuilly sur Seine (FR)

( * ) Notice: Subject to any disclaimer, the term of this patent is extended or adjusted under 35 U.S.C. 154(b) by 272 days.

(21) Appl. No.: 13/471,163

(22) Filed: May 14, 2012

(65) Prior Publication Data

US 2013/0118281 A1 May 16, 2013

(30) Foreign Application Priority Data

Aug. 7, 2011 (FR) ...................................... 11 02156

(51) Int. Cl.
*F16H 21/44* (2006.01)
*B25J 17/02* (2006.01)
*B25J 9/10* (2006.01)

(52) U.S. Cl.
CPC .............. *F16H 21/44* (2013.01); *B25J 17/0266* (2013.01); *B25J 9/104* (2013.01); *Y10S 901/22* (2013.01)
USPC .................. 74/490.04; 74/490.01; 74/490.03; 901/22

(58) Field of Classification Search
CPC ....... F16H 21/44; B25J 9/104; B25J 17/0266; A61B 19/2203
USPC ............... 74/490.01, 490.02, 490.03, 490.04, 74/490.05, 490.06; 901/22
See application file for complete search history.

(56) References Cited

U.S. PATENT DOCUMENTS

| | | | |
|---|---|---|---|
| 3,861,612 A * | 1/1975 | Kubo | 242/555.6 |
| 5,941,128 A | 8/1999 | Toyama et al. | |
| 6,224,514 B1 * | 5/2001 | Price | 482/50 |
| 7,395,136 B2 * | 7/2008 | Osten | 700/258 |
| 7,823,845 B2 * | 11/2010 | Fontana et al. | 248/200.1 |
| 2002/0015624 A1 | 2/2002 | Wang et al. | |
| 2003/0062440 A1 * | 4/2003 | Ohshio et al. | 242/528 |
| 2003/0209642 A1 * | 11/2003 | Fontana et al. | 248/231.91 |
| 2004/0144288 A1 | 7/2004 | Chiang | |
| 2005/0173579 A1 * | 8/2005 | Barea | 242/365.7 |
| 2006/0254380 A1 | 11/2006 | Bergmann et al. | |
| 2008/0277552 A1 * | 11/2008 | Duval | 248/280.11 |
| 2009/0270231 A1 * | 10/2009 | Hall et al. | 482/79 |
| 2011/0208326 A1 * | 8/2011 | Dror | 700/71 |
| 2012/0322628 A1 * | 12/2012 | Gautier | 482/97 |
| 2013/0085531 A1 * | 4/2013 | Hartman et al. | 606/245 |
| 2013/0098165 A1 * | 4/2013 | Bruce | 73/828 |
| 2013/0282023 A1 * | 10/2013 | Burbank et al. | 606/130 |

FOREIGN PATENT DOCUMENTS

DE     10019162 A1     10/2001

* cited by examiner

*Primary Examiner* — David M Fenstermacher
(74) *Attorney, Agent, or Firm* — Baker and Hostetler LLP

(57) ABSTRACT

A linear actuator suitable for mobilizing a load comprises: a leg linked to the load by one of its ends with a ball joint with three degrees of freedom in rotation; a plate that is mobile in translation along an axis belonging to a plane of a support of the actuator, said mobile plate being mechanically linked to the leg by its other end. The linear actuator also comprises at least one first elastic cable, fixed by one of its ends to the mobile plate, and fixed by its other end to the support, being engaged in a first pulley fixed to the support. The actuator can notably be used to mobilize a simulation platform mounted on a hexapod.

10 Claims, 4 Drawing Sheets

LINEAR ACTUATOR

CROSS-REFERENCE TO RELATED APPLICATION

This application claims priority to foreign French patent application No. FR 1102156, filed on Jul. 8, 2011, the disclosure of which is incorporated by reference in its entirety.

FIELD OF THE INVENTION

The present invention relates to a linear actuator, notably used to mobilize a simulation platform mounted on a hexapod.

BACKGROUND

The invention relates to the field of motion system actuators used for example for: flight and vehicle driving simulators. The simulators for which the invention applies are simulators comprising, for example, a real piloting or driving booth. The use of a real booth means that the simulator has a weight and a size that are both significant.

In order to maintain the simulators, reduce the cost of the infrastructures in which the simulators are placed, and the cost of the energy to be supplied to mobilize a simulator, it is increasingly commonplace to use electric motion actuators instead of hydraulic motion actuators.

One of the problems associated with the use of electric motion actuators relates to having to take into account the static forces linked to the load being displaced and the dynamic forces linked to the weight and the inertia of the load being displaced.

There are various compensation solutions available, such as: pneumatic compensation, hydraulic compensation.

A pneumatic compensation system operates notably with accumulators and a compressor. The compressor compresses a gas in the accumulators. The accumulators are elsewhere linked to an actuator or to a compensation cylinder. The pneumatic compensation system supplies a relatively constant, unidirectional force.

A hydraulic compensation system operates notably with accumulators and a hydraulic plant. The hydraulic plant compresses an oily solution in the accumulators. The accumulators are linked to the actuator. The hydraulic compensation system also supplies a relatively constant, unidirectional force.

The pneumatic and hydraulic compensation solutions have the following main defects:
- they have a large ground footprint;
- they are expensive to manufacture and maintain;
- they are subject to pressure equipment usage standards which are highly restrictive;
- they do not adapt well according to the variations of the static force applied to the actuator because the compensation force is relatively constant.

Furthermore, the pneumatic compensation systems take a relatively long time to start up, adding an additional constraint to the use of the simulator.

SUMMARY OF THE INVENTION

One aim of the invention is notably to overcome the above-mentioned drawbacks. To this end, the subject of the invention is a linear actuator suitable for mobilizing a load. Said linear actuator comprises:

- a leg linked to the load by one of its ends with a ball joint with three degrees of freedom in rotation;
- a plate that is mobile in translation along an axis belonging to a plane of a support of the actuator, said mobile plate being mechanically linked to the leg by its other end.

Said actuator also comprises at least one first elastic cable, fixed by one of its ends to the mobile plate, and fixed by its other end to the support, being engaged in a first pulley fixed to the support.

In a particularly advantageous embodiment, the first elastic cable and the first pulley can be arranged so as to obtain a stable balance for the linear actuator.

In another embodiment, the first elastic cable can be fixed to a first lateral part of the mobile plate. The linear actuator may comprise at least one second elastic cable fixed by one of its ends to a second lateral part of the mobile plate, and fixed by its other end to the support. The second elastic cable is engaged in a second pulley fixed to the support. The first and second elastic cables, the first pulley and the second pulley are arranged so as to obtain a stable balance for the linear actuator.

The first elastic cable and the second elastic cable can act on the mobile plate in the same direction.

In another embodiment of the invention, the first elastic cable and the second elastic cable can act on the mobile plate in opposite directions.

The elastic cables may be bungee cords.

In a particularly advantageous embodiment, the first cable and the second cable can have a different stiffness.

Another subject of the invention is a hexapod actuator, comprising at least one linear actuator according to the invention.

Advantageously, the hexapod actuator can be suitable for mobilizing a simulation platform.

Advantageously, the hexapod actuator can be suitable for mobilizing a simulation platform of a piloting station of a mobile vehicle.

The main advantages of the invention are notably that it is reliable and provides good resistance over time.

BRIEF DESCRIPTION OF THE DRAWINGS

Other features and advantages of the invention will emerge from the following description, given as a nonlimiting illustration, and in light of the appended drawings which represent.

DETAILED DESCRIPTION

Figure 1:
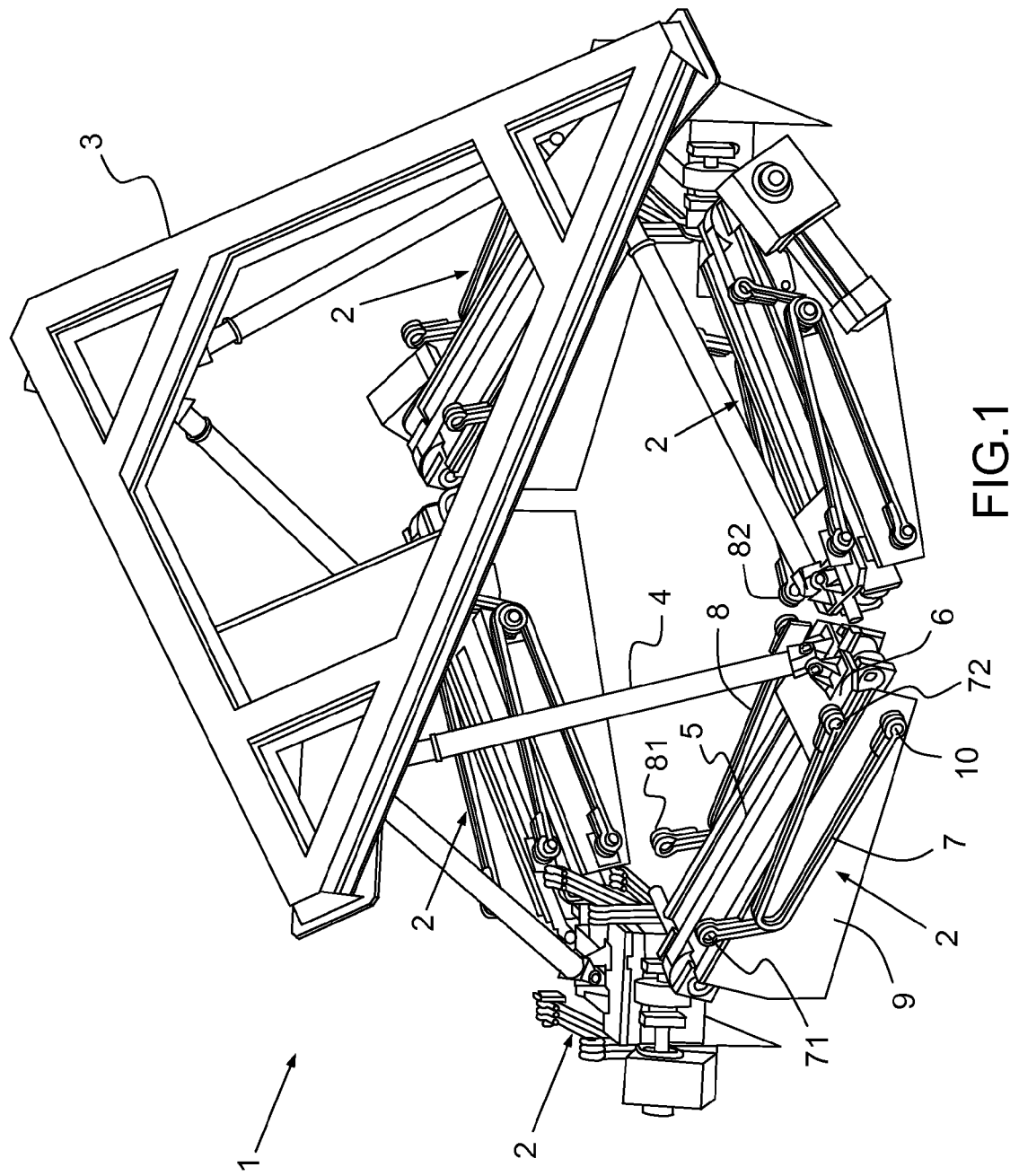
FIG. 1: a hexapod positioner using at least one actuator according to the invention.

FIG. 1 represents a hexapod positioner 1 comprising at least one actuator 2 according to the invention. The hexapod positioner 1 can set a mobile platform 3 in motion. The hexapod positioner 1 can be produced according to the Stewart platform concept allowing for movement of the mobile platform 3 according to six degrees of freedom. Three degrees of freedom in translation, three degrees of freedom in rotation according to pitch, roll and yaw angles, otherwise called Euler angles. The Stewart platforms are notably used to produce simulators after a design by K. Cappel. The Stewart platforms form part of the family of parallel robots.

The hexapod positioner 1 notably comprises six actuators. The load of the platform 3 is distributed over the six actuators of the hexapod positioner 1. For example, the six actuators may be actuators 2 according to the invention. In another exemplary embodiment, a hexapod positioner may comprise at least one actuator 2 according to the invention and other actuators according to the prior art. An actuator 2 according to the invention notably comprises a leg 4, which can, for example, be produced by a link rod and have a fixed length, or by a cylinder and have a variable length. Each leg 4 is linked by a top end to the mobile platform 3 via a ball joint with three degrees of freedom in rotation, not represented in FIG. 1. The ball joint is fixed to the mobile platform 3. The bottom ends of each leg can be displaced along a straight segment. The straight segment may be produced by a ramp 5, for example inclined, on which a carriage 6 is displaced. The carriage 6 is therefore displaced along an axis that is substantially parallel to the ramp 5. The bottom end of the leg 4 can be mounted on the carriage so as to have a degree of freedom in rotation, on an axis that is, for example, substantially perpendicular to the ramp 5. The actuator 2 according to the invention may also comprise a first elastic compensation device, comprising at least one elastic cable 7, 8. In FIG. 1 and for the example, the first compensation device comprises two elastic cables 7, 8. A first cable 7 of the first elastic compensation device can be linked by one of its ends, for example to a first lateral part of a plinth 9 on which the ramp 5 is fixed. The plinth 9 may, for example, be placed directly on the ground. The plinth 9 is immobile by definition. The first cable 7 of the first elastic compensation device can be linked by another of its ends to a first side of the carriage 6. A second elastic cable 8 of the first elastic compensation device can be linked by one of its ends for example to a second lateral part of a plinth 9 by a first fixed attachment point 10. The second elastic cable 8 of the first elastic compensation device can be linked by another of its ends to a second side of the carriage 6. The different attachment points of the elastic cables of the first compensation device on the plinth 9 and on the carriage 6 are given by way of example and can be adapted according to one of various other configurations of the hexapod positioner 1. In FIG. 1, the elastic compensator according to the invention is represented according to two out of all the possible positions: a first position 71, 81 in which the carriage 6 is at a first end of the ramp 5, a second position 72, 82 in which the carriage is at a second end of the ramp 5.

Figure 2:
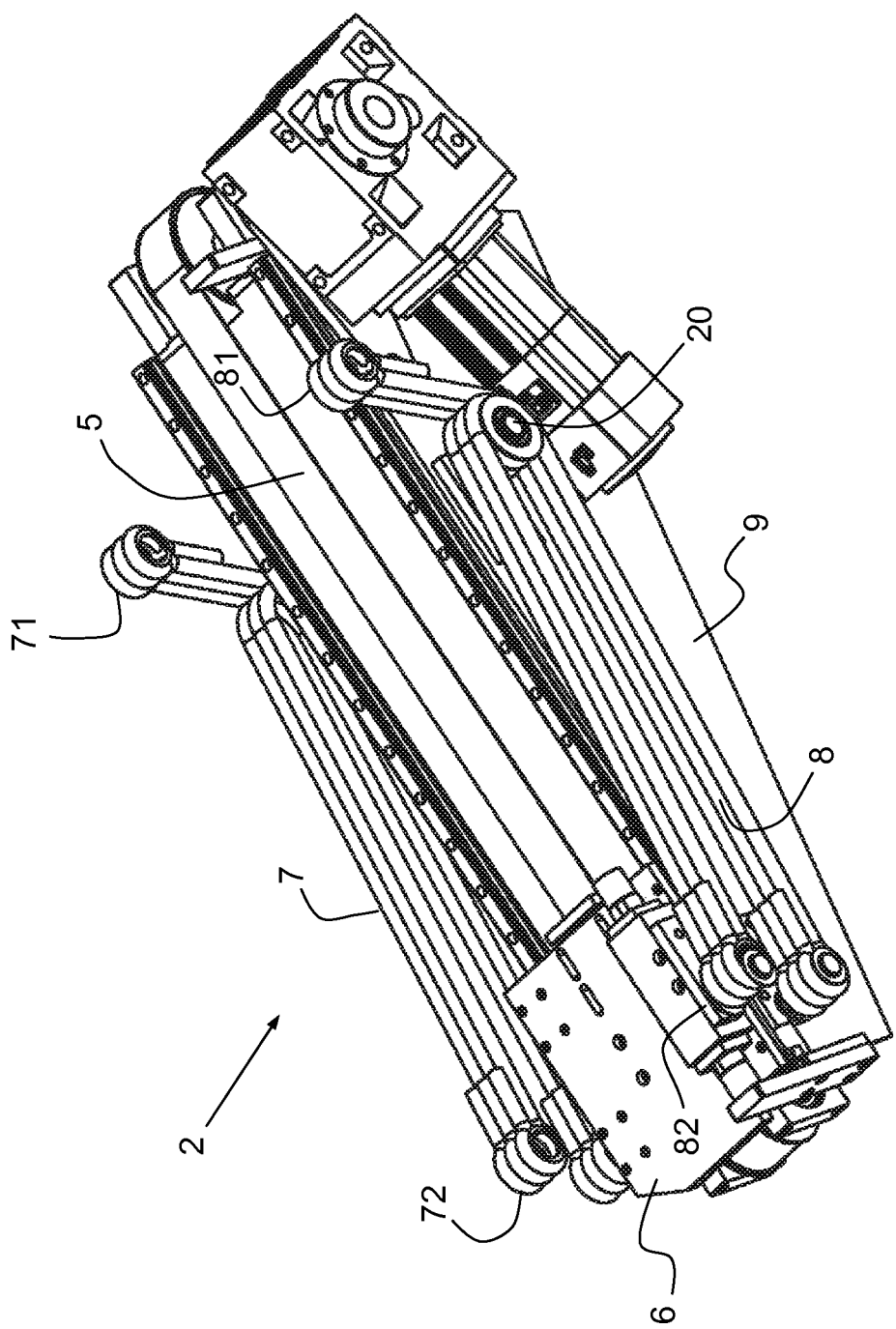
FIG. 2: an actuator according to the invention.

FIG. 2 represents a partial view of an actuator 2 according to the invention. FIG. 2 notably represents the first and second elastic cables 7, 8, as represented in FIG. 1.

FIG. 2 also represents two of the possible positions of the carriage 6 on the ramp 5: a first position 71, 81 in which the carriage is at a first end of the ramp 5, a second position 72, 82 in which the carriage is at a second end of the ramp 5. The first position 71, 81 may be a so-called "bottom" position and the second position 81, 82 may be a so-called "top" position.

A first pulley 20 is fixed to the first lateral part of the plinth 9. The second elastic cable 8 is engaged in the first pulley 20 to follow the movement of the carriage 6 along the ramp 5 from the first position 71, for example a bottom position, to the second position 81, for example a top position. The first pulley 20 is notably a return pulley.

A second pulley, not represented in FIG. 2, is fixed to the second lateral part of the plinth 9. The first elastic cable 7 is engaged in the second pulley to follow the movement of the carriage 6 along the ramp 5 from the first bottom position 71, to the second top position 81. The second pulley is notably a return pulley.

Such a configuration of the compensation device advantageously makes it possible to apply to the carriage a return force that varies according to the position of the carriage 6 on the ramp 5. The return force is exerted by the first and second elastic cables which act in the same direction in FIG. 2. For example, for a device as represented in FIG. 2, the return force is:

maximum when the carriage 6 is at the first bottom position 71;

zero when the carriage 6 is vertical to the first and second pulleys 20;

reversed when the carriage 6 is at the second top position 81.

Advantageously, such a compensation device makes it possible to return the carriage 6 to a stable balance position, that is to say, to a position for which the return force is zero, without supplying additional energy. Such a capacity makes it possible to increase the safety of the positioner, because, if a problem occurs, the actuators according to the invention return to a stable balance without requiring a supply of additional energy. This is particularly advantageous when the energy sources are faulty.

Figure 3:
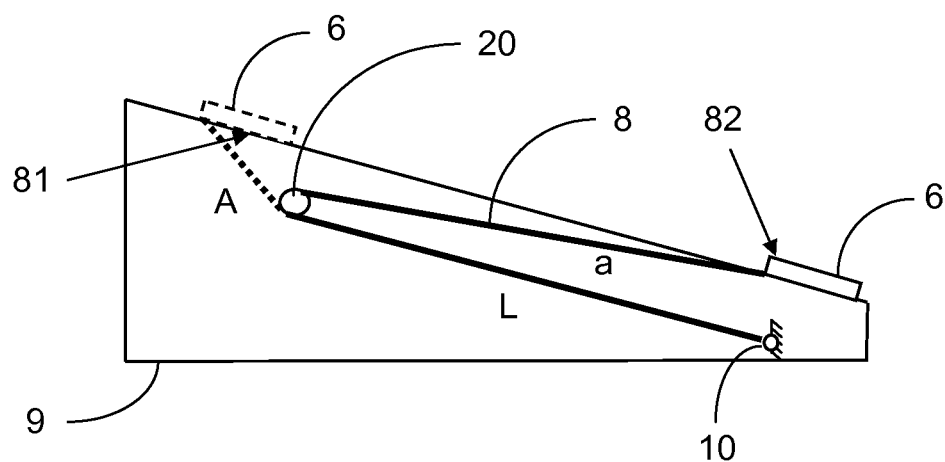
FIG. 3: a compensation system of the actuator according to the invention.

FIG. 3 schematically represents a part of the actuator according to the invention seen in profile. FIG. 3 notably represents: the second elastic cable 8, the plinth 9, the carriage 6 in the two extreme positions 81, 82, the second pulley 20.

In a particularly advantageous exemplary embodiment of the first compensation device, the elastic cables 7, 8 may be bungee cords, that is to say, elastic cables composed of a core made of rubber and a jacket for example made of fabric, including, for example, hooks at each end to moor them.

The elastic cables 7, 8 of the first compensation device have a return function. Thus, any return device such as a spring can be used instead of the elastic cables 7, 8. However, the use, for example, of cables made of elastomer is advantageously inexpensive. Advantageously, the first compensation device can be dimensioned and configured according to the characteristics, notably the elasticity, of the elastomer used. Similarly, the characteristics of the elastomer used can be chosen as a function of the dimensions and characteristics of the actuator according to the invention and, more generally, of the positioner in which the actuator according to the invention is incorporated. Advantageously, the first compensation device, represented in FIG. 3, comprises few components.

Figure 4:
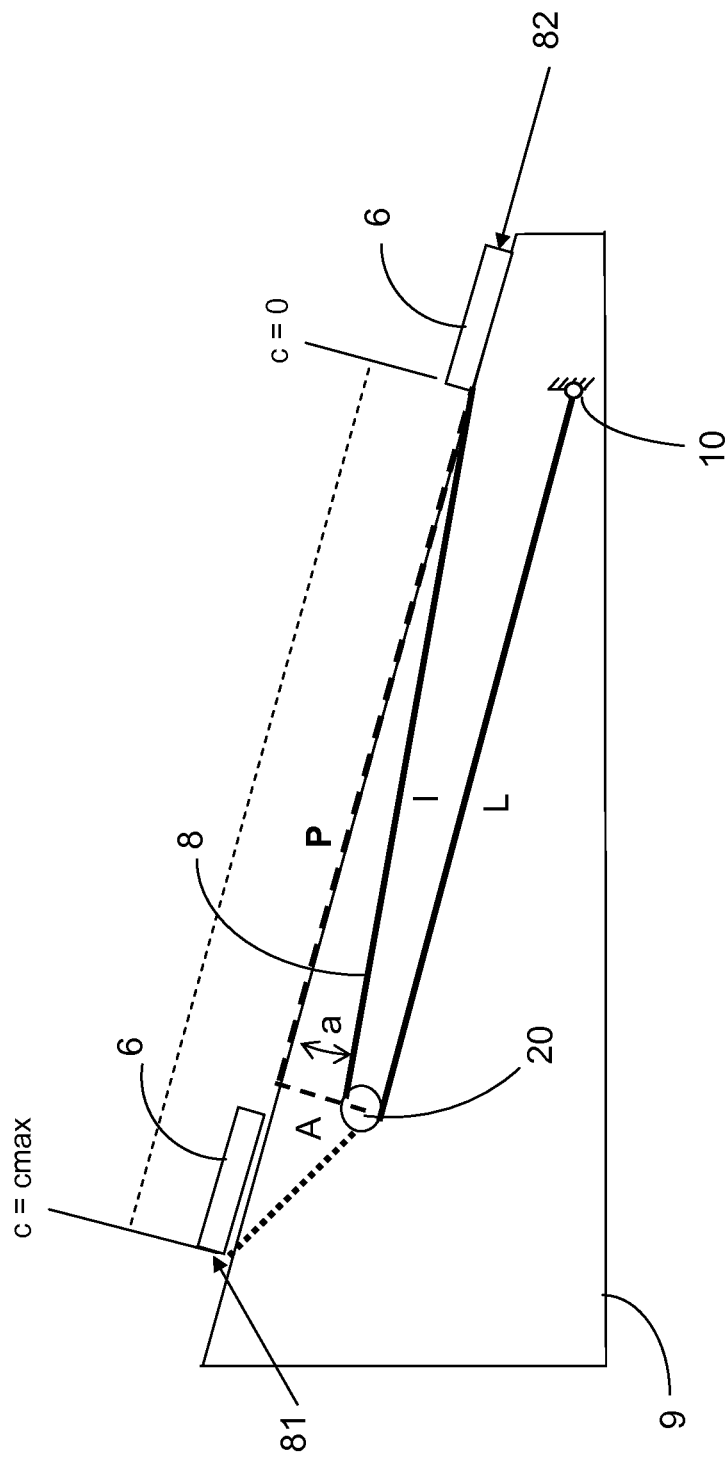
FIG. 4: an example of dimensioning of the compensation system of the actuator according to the invention.

FIG. 4 represents an example of positioning of the elastic cables 7, 8 in relation to the actuator according to the invention in order to be able to generate compensation forces in both directions of displacement of the carriage 6 of the linear actuator 2 according to the invention. FIG. 4 represents, like FIG. 3, a profile view of the device. The positioning of the first cable 7 is performed in the same way as the positioning of the second cable 8 as described below.

The positioning and the dimensioning of the cables 7, 8 can be defined as follows:

definition of the static forces to be supplied by the cables 7, 8 according to the displacement of the carriage 6 to obtain a compensation that is best suited to the linear actuator according to the invention;

defining a positioning of the cables 7, 8 that makes it possible to reproduce these forces.

The formulae for dimensioning the actuator according to the invention may be as follows:

$$l = L + \sqrt{A^2 + (P-c)^2} \tag{1000}$$

$$\sin(a) = A/(l-L) = A/\sqrt{A^2 + (P-c)^2} \quad (1001)$$

$$f = F(I/I_0) \cdot \cos(a) \quad (1002)$$

in which:
- P may be a position of the second pulley 20, projected onto the axis of displacement of the carriage 6, P being, for example, measured in relation to the point of attachment of the second cable 8 on the carriage 6 when the carriage 6 is in the second bottom position 82, P may be independent of the travel of the carriage;
- A may be a position of the second pulley 20 projected onto an axis that is substantially orthogonal to the axis of displacement of the carriage 6, P being measured in relation to the point of attachment of the second cable 8 on the carriage 6, A may be independent of the travel of the carriage;
- L may be a length between the first fixed point of attachment 10 of the second cable 8 on the plinth 9 and the pulley 20, L possibly being independent of the travel of the carriage 6;
- c may represent the length of the travel of the carriage 6: when the carriage is in the second bottom position 82, c is, for example, zero and when the carriage is in the first top position 81, c is, for example, cmax;
- a may be an angle between the axis of displacement of the carriage 6 and a straight line passing through the centre of the second pulley 20 and the first fixed point of attachment 10;
- I may be the length of the elastomer between the second pulley 20 and the point of attachment of the second cable 8, I varying according to the position of the carriage 6 on the ramp 5;
- $I_0$ may be the length when slack of the second cable 8, that is to say, the length of the second cable 8 when it is not attached;
- F may be the return force exerted by the cable 8 on the carriage 6, the return force may depend on the length of the cable 8 and notably on the ratio $I/I_0$ and on the elasticity of the cable 8, the elasticity depending on the material used to produce the cable 8, F may therefore be a function dependent on $I/I_0$;
- f may be a projection onto the axis of displacement of the return force exerted by the second cable 8 on the carriage 6.

Among these parameters, c depends on the conditions of use of the actuator according to the invention. c is therefore a fixed parameter. Similarly, the values of f for c=0 and c=cmax depend on the use of the actuator according to the invention, so f is therefore fixed.

To facilitate the mounting of the actuator according to the invention, $I_0$ may be chosen such that $I_0 = L+A$: in this way, f for c=P is zero.

It should be noted that the dimensioning of the actuator is performed in the same way by using one or two cables, since the forces are distributed in the same way on both cables.

Figure 5:
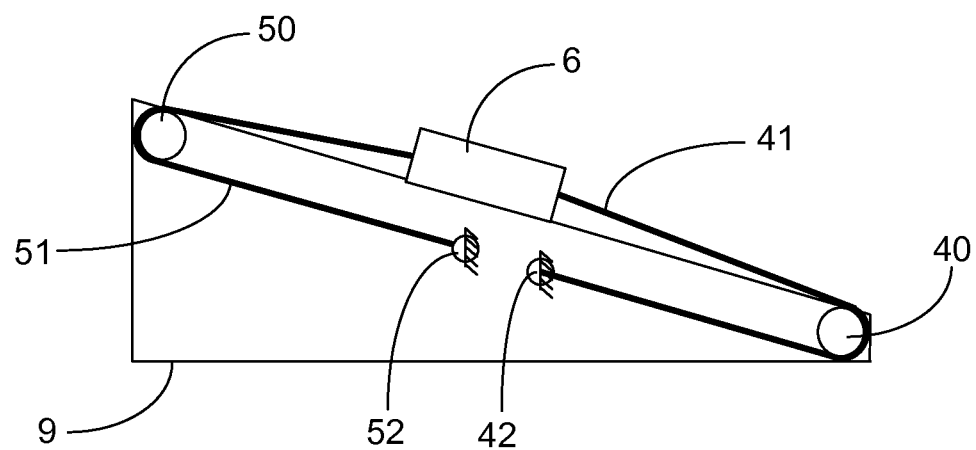
FIG. 5: another embodiment of a compensation system of the actuator according to the invention.

FIG. 5 represents an example of a second embodiment of the linear actuator according to the invention. FIG. 5 is a profile representation of a part of the actuator 2 according to the invention.

The second embodiment of the linear actuator 2 according to the invention as represented in FIG. 2 for example may comprise a second compensation device comprising four elastic cables 41, 51. The four elastic cables 41, 51 replace the first and second elastic cables 7, 8 represented in FIGS. 1, 2, 3, 4. In FIG. 5, only two cables 41, 51 are represented for the example, the other two cables being arranged symmetrically to the third and fourth elastic cables 41, 51, in relation to the axis of displacement of the carriage 6. In another embodiment, it is possible to use only two elastic cables 41, 51, the two elastic cables being positioned in such a way as to act like the four elastic cables cited in the example.

The second compensation device notably comprises a third cable 41. The third cable 41 can be fixed on the one hand to the carriage 6 and on the other hand to the plinth 9 via a second fixed attachment point 42. The third cable 41 is engaged in a third pulley 40 fixed to the plinth 9. The third pulley 40 may be located, for example, vertical to a bottom end of travel of the carriage 6. Other positions may also be envisaged without prejudicing the advantages provided by the second compensation system.

The second compensation device also comprises a fourth cable 51 fixed on the one hand to the carriage 6 and on the other hand to the plinth 9 via a third fixed attachment point 52. The fourth cable 51 is engaged in a fourth pulley 50 fixed to the plinth 9. For example, the fourth pulley 50 is situated at the top end of travel of the carriage 6. Other positions may also be envisaged without prejudicing the advantages provided by the second compensation system.

The second compensation device offers the same advantages as the first compensation device. The second compensation device also has the advantage of being able to use third and fourth cables 41, 42 of different stiffnesses in order to enhance the management of the return forces. This is because the third and fourth cables 41, 42 exert a return force in opposite directions.

A compensation device used by a linear actuator according to the invention can be dimensioned and defined as follows:
- Definition of the static forces to be compensated according to the displacement of the carriage 6, in order to define an optimum compensation for the linear actuator 2;
- Definition of a combination of elastic cables that makes it possible to reproduce the static forces defined previously.

Advantageously, the compensation of the static forces by a passive compensation device as described in the invention makes it possible to reduce the dimensioning of a motor drive chain of the actuator according to the invention.

A generation of force capable of compensating a static force being applied to the actuator according to the invention also makes it possible to reduce to the maximum the energy consumption of the actuator according to the invention.

Advantageously, the actuator according to the invention makes it possible to generate a variable force, because the static force to be compensated varies according to the dynamic configuration of the actuator according to the invention.

In the actuator according to the invention, the compensation force can advantageously be reversed, which enables the compensation device to be effective for all the operating configurations of the actuator.

Advantageously, the compensation system itself consumes no energy.

The actuator according to the invention also offers enhanced safety in relation to actuators comprising pressurized compensation devices. This is because the actuator according to the invention advantageously makes it possible to avoid having the actuator return to its stable balance position at full speed.

Advantageously, the actuator according to the invention makes it possible to have no dead travel.

Advantageously, each elastic cable may be implemented in the form of one or more elastic cables, or bungee cords, in order to be able to adapt the compensation very finely in relation to the forces in play for mobilizing the simulation platform.

The invention claimed is:

1. A linear actuator suitable for mobilizing a load, comprising:
   a leg linked to the load by one of its ends with a ball joint with three degrees of freedom in rotation;
   a plate that is mobile in translation along an axis belonging to a plane of a support of the actuator, said mobile plate being mechanically linked to the leg by its other end; and
   at least one first elastic cable, fixed by one of its ends to the mobile plate, and fixed by its other end to the support, being engaged in a first pulley fixed to the support.

2. The linear actuator according to claim 1, wherein said first elastic cable and said first pulley are arranged so as to obtain a stable balance for the linear actuator.

3. The linear actuator according to claim 1, wherein said first elastic cable is fixed to a first lateral part of the mobile plate, said linear actuator comprises at least one second elastic cable fixed by one of its ends to a second lateral part of the mobile plate, and fixed by its other end to the support, being engaged in a second pulley fixed to the support, said first elastic cable, second elastic cable, first pulley and second pulley being arranged so as to obtain a stable balance for the linear actuator.

4. The linear actuator according to claim 3, wherein the first elastic cable and the second elastic cable act on the mobile plate in the same direction.

5. The linear actuator according to claim 3, wherein the first elastic cable and the second elastic cable act on the mobile plate in opposite directions.

6. The linear actuator according to claim 1, wherein said elastic cables are bungee cords.

7. The linear actuator according to claim 5, wherein the first cable and the second cable have a different stiffness.

8. A hexapod actuator, comprising at least one linear actuator according to claim 1.

9. The hexapod actuator according to claim 8, being suitable for mobilizing a simulation platform.

10. The hexapod actuator according to claim 9, being suitable for mobilizing a simulation platform of a piloting station of a mobile vehicle.

* * * * *